United States Patent
Chen et al.

(10) Patent No.: US 8,150,143 B2
(45) Date of Patent: Apr. 3, 2012

(54) DYNAMIC CALIBRATION METHOD FOR SINGLE AND MULTIPLE VIDEO CAPTURE DEVICES

(75) Inventors: I-Hsien Chen, Fongshan (TW);
Sheng-Jyh Wang, Taichung (TW)

(73) Assignee: National Chiao Tung University, Hsinchu (TW)

( * ) Notice: Subject to any disclaimer, the term of this patent is extended or adjusted under 35 U.S.C. 154(b) by 1026 days.

(21) Appl. No.: 12/100,386

(22) Filed: Apr. 9, 2008

(65) Prior Publication Data

US 2009/0208063 A1 Aug. 20, 2009

(30) Foreign Application Priority Data

Feb. 19, 2008 (TW) .............................. 97105696 A

(51) Int. Cl.
*G06K 9/00* (2006.01)
*H04N 17/00* (2006.01)
*G06T 15/00* (2011.01)
*G06F 3/041* (2006.01)

(52) U.S. Cl. ......... 382/154; 348/187; 345/419; 345/178
(58) Field of Classification Search ................... 382/154, 382/107; 345/419, 178; 348/187
See application file for complete search history.

(56) References Cited

U.S. PATENT DOCUMENTS

| | | | |
|---|---|---|---|
| 6,594,600 B1 | 7/2003 | Arnoul et al. | |
| 6,931,340 B2 | 8/2005 | Jackson et al. | |
| 7,003,136 B1 * | 2/2006 | Harville | 382/103 |
| 7,035,450 B1 * | 4/2006 | Muller et al. | 382/154 |
| 7,239,752 B2 | 7/2007 | Neumann et al. | |
| 7,747,067 B2 * | 6/2010 | Popescu et al. | 382/154 |
| 2008/0211815 A1 * | 9/2008 | Gordon | 345/475 |
| 2010/0026786 A1 * | 2/2010 | Link | 348/47 |

OTHER PUBLICATIONS

Dang et al, Self-calibration for active automotive stereo vision, Jun. 13-15, 2006,Intelligent Vehicles Symposium 2006, pp. 364-369.*
Ankur Jain, Dan Kopell, Kyle Kakligian, and Yuan-Fang Wang, "Using stationary-dynamic camera assemblies for wide-area video surveillance and selective attention," IEEE Conf. Computer Vision and Pattern Recognition, Jun. 2006, pp. 537-544, vol. 1.
Kai-Tai Song, and Jen-Chao Tai, "Dynamic calibration of pan-tilt-zoom cameras for traffic monitoring," IEEE Transactions on Systems, Man and Cybernetics, Part B, Oct. 2006, pp. 1091-1103, vol. 36, Issue 5.
Yuantao Li, Fenghua Zhu, Yunfeng Ai, and Fei-Yue Wang, "On Automatic and Dynamic Camera Calibration Based on Traffic Visual Surveillance," IEEE Symposium on Intelligent Vehicles, Jun. 2007, pp. 358-363.
C. Tony Huang and O. Robert Mitchell, "Dynamic camera calibration," in Proc. Int. Symposium on Computer Vision, Nov. 1995, pp. 169-174.
B. Zhang, Y. F. Li and Y. H. Wu, "Self-recalibration of a structured light system via plane-based homography," Pattern Recognition, Apr. 2007, pp. 1368-1377, vol. 40, Issue 4.

* cited by examiner

*Primary Examiner* — Kathleen Y Dulaney
(74) *Attorney, Agent, or Firm* — Rosenberg, Klein & Lee

(57) ABSTRACT

The present invention discloses a dynamic calibration method for a single and multiple video capture devices. The present invention can acquire the variations of the pan angle and tilt angle of a single video capture device according to the displacement of the feature points between successive images. For a plurality of video capture devices, the present invention includes the epipolar-plane constraint between a plurality of video capture devices to achieve the goal of dynamical calibration. The calibration method in the present invention does not require specific calibration patterns or complicated correspondence of feature points, and can be applied to surveillance systems with wide-range coverage.

7 Claims, 11 Drawing Sheets

DYNAMIC CALIBRATION METHOD FOR SINGLE AND MULTIPLE VIDEO CAPTURE DEVICES

BACKGROUND OF THE INVENTION

1. Field of the Invention

The invention relates to a video surveillance system, and more particularly, to a dynamic calibration method for a single and multiple video capture devices.

2. Description of the Related Art

For a surveillance system with a plurality of pan-tilt-zoom (PTZ) cameras, cameras may pan, tilt, or zoom from time to time to acquire different views of the monitored scene. However, when a camera pans or tilts, its extrinsic parameters change accordingly. For this type of surveillance systems, how to accurately and efficiently recalibrate the extrinsic parameters of a plurality of PTZ cameras has become an important issue.

Up to now, various kinds of approaches have been developed to calibrate static camera's intrinsic and extrinsic parameters. For example, an off-line method has been proposed to find the relationship between the realized rotation angle and the requested angle so that they could control a PTZ camera to keep tracking moving objects in the monitored scene. (A. Jain, D. Kopell, K. Kakligian, and Y-F Wang, "Using stationary-dynamic camera assemblies for wide-area video surveillance and selective attention," Proceedings of IEEE Conf. Computer Vision and Pattern Recognition, vol. 1, pp. 537-544, June 2006). Even though the error is corrected via the off-line training for each rotation request, yet it is still difficult to estimate the camera pose for each camera. Further, this method only demonstrated the dynamic calibration of a single PTZ camera, but not the calibration among a plurality of PTZ cameras. Another method utilized the marks and width of parallel lanes to calibrate PTZ cameras. (K.-T. Song and J.-C. Tai, "Dynamic calibration of pan-tilt-zoom cameras for traffic monitoring," Proceedings of IEEE Transactions on Systems, Man and Cybernetics, Part B, vol. 36, Issue 5, pp. 1091-1103, October 2006). Although this method is practical for traffic monitoring, it is not generally enough for other types of surveillance systems.

Moreover, a dynamic camera calibration method with narrow-range coverage has been proposed. (C. T. Huang and O. R. Mitchell, "Dynamic camera calibration," Proceedings of Proc. Int. Symposium on Computer Vision, pp. 169-174, November 1995). For a pair of cameras, this method performed the correspondence of feature points on the image pair and used coplanar geometry for camera calibration. Still another method utilized plane-based homography to determine the relative pose between a calibrating camera and a projector. (B. Zhang, "Self-recalibration of a structured light system via plane-based homography", Proceedings of Pattern Recognition, vol. 40, Issue 4, pp. 1168-1377, April 2007). Nevertheless, this method requires a corresponding feature point and a structured light system to generate plane-based calibration patterns.

The aforementioned methods required corresponding feature points and/or special calibration patterns. However, to dynamically calibrate a plurality of PTZ cameras, calibration patterns and landmarks are not always applicable since they may get occluded or even move out of the captured scenes when cameras pan or tilt. On the other hand, if using the correspondence of feature points, we need to keep updating the correspondence of feature points when cameras rotate. For a wide-range surveillance system with many PTZ cameras, the correspondence of feature points cannot be easily solved.

Therefore, to solve the aforementioned problems, the present invention proposes a novel dynamic calibration method to improve the efficiency and feasibility for the calibration of video capture devices.

SUMMARY OF THE INVENTION

It is therefore one of the many objectives of the claimed invention to provide a dynamic calibration method for the video capture device. The present invention can acquire the variations of the pan angle and tilt angle of a single video capture device according to the displacement of feature points. For a plurality of video capture devices, the present invention additionally considers the epipolar-plane constraint among a plurality of video capture devices to achieve the goal of dynamical calibration. The calibration method in the present invention does not require specific calibration patterns or complicated correspondence of feature points, and can be applied to surveillance systems with wide-range coverage.

Another objective of the claimed invention is to provide a dynamic calibration method for the video capture device, which allows the presence of moving objects in the captured scenes while performing calibration. The calibration method in the present invention discards the feature points related to a moving object to increase the accuracy of calibration, and is very useful for applications related to active video surveillance.

A dynamic calibration method for the video capture device is disclosed. The calibration method comprises: providing at least one video capture device for capturing at least one initial image; panning or tilting the video capture device for capturing at least one successive image with different angles; extracting at least one initial feature point from the initial image, and extracting at least one feature point from said successive image, wherein the feature point is corresponding to the initial feature point; and acquiring the variations of a pan angle and a tilt angle of the video capture device according to the displacement between the initial feature point and the feature point. When the initial feature point or the feature point comes from a moving object, discard this initial feature point and the feature point.

Another dynamic calibration method for multiple video capture devices is disclosed. The calibration method comprises: providing a plurality of video capture devices; capturing at least one initial image for each video capture device, extracting at least one initial feature point from the initial image, and forming epipolar planes according to the projection centers of a video capture device pair and the initial feature points on the images of this pair of video capture devices; and panning or tilting the video capture device(s) for capturing at least one successive image with different angles, extracting at least one feature point from the successive image, wherein the feature point is corresponding to the initial feature point and located on the corresponding epipolar plane; and acquiring the variations of a pan angle and a tilt angle of each video capture device according to the epipolar-plane constraint and the displacement between the initial feature point and the feature point.

Below, the embodiments of the present invention are described in detail in cooperation with the attached drawings to make easily understood the objectives, technical contents, characteristics and accomplishments of the present invention.

DETAILED DESCRIPTION OF THE INVENTION

Figure 1:
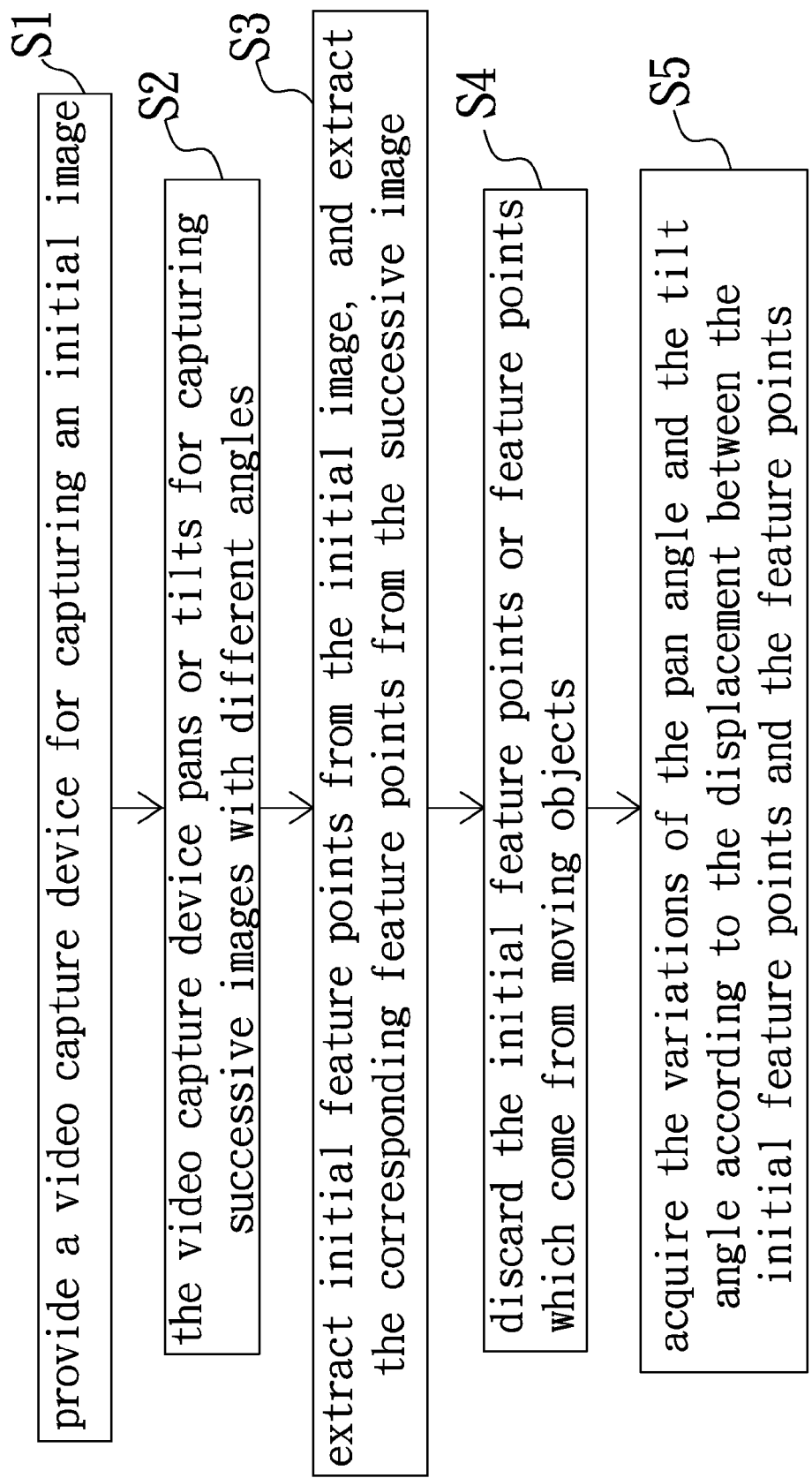
FIG. 1 is a flowchart illustrating a dynamic calibration method for a single video capture device according to an embodiment of the present invention.

Please refer to FIG. 1. FIG. 1 is a flowchart illustrating a dynamic calibration method of a single video capture device according to an embodiment of the present invention. Provided that substantially the same result is achieved, the steps of the flowchart shown in FIG. 1 need not be in the exact order shown and need not be contiguous, that is, other steps can be intermediate. As shown in step S1, a video capture device is provided to capture the initial image, wherein the initial pose of the video capture device is defined. Then proceed to step S2. The video capture device pans or tilts in order to capture the successive images with different angles. In step S3, the video capture device can extract a plurality of initial feature points from the initial image based on KLT (Kanade-Lucas-Tomasi) algorithm, and extract the feature points corresponding to the initial feature points from the successive image. Please note that, the Kanade-Lucas-Tomasi algorithm is considered well known in the pertinent art and only an example of extracting feature points, and is not meant to be taken as limitations. That is, as will be easily observed by a personal of ordinary skill in the art, other embodiments of the present disclosure utilizing different algorithms are also possible. As shown in step S4, if the initial feature points in the initial image and the feature points in the successive image coming from moving objects, these feature points should be discarded in order to increase the accuracy of calibration. Lastly, proceed to step S5. The variations of a pan angle and a tilt angle of the video capture device can be acquired by the displacement between the initial feature points and the feature points.

The further detailed dynamic calibration method for a single video capture device is described as follows.

Figure 2:
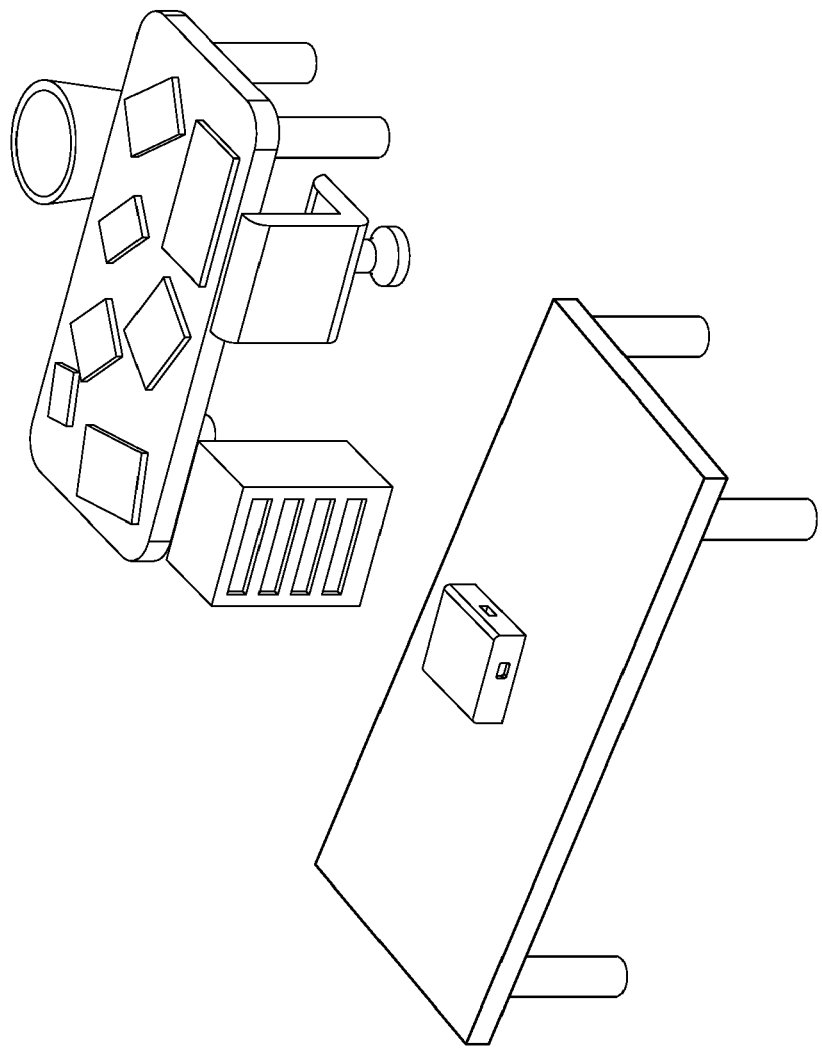
FIG. 2 is a diagram schematically illustrating a calibration system for a video capture device according to an embodiment of the present invention.
Figure 2:
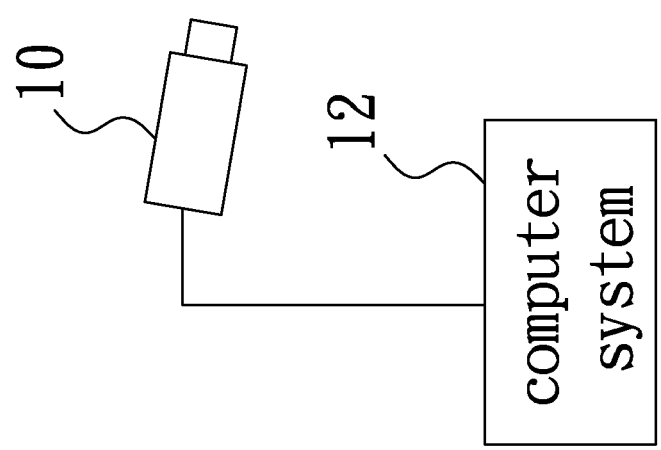

Please refer to FIG. 2. FIG. 2 is a diagram schematically illustrating a calibration system for a video capture device according to an embodiment of the present invention. As shown in FIG. 2, the calibration system in the present invention includes a video capture device 10 in an environment and a computer system 12 which connects to the video capture device 10. Please note that, the video capture device 10 can be a pan-tilt-zoom (PTZ) camera, or other video devices. In this embodiment, the video capture device 10 can be set on or near the ceiling. However, in other embodiments, the setup position can be assigned by different conditions depending on design requirements.

Figure 3:
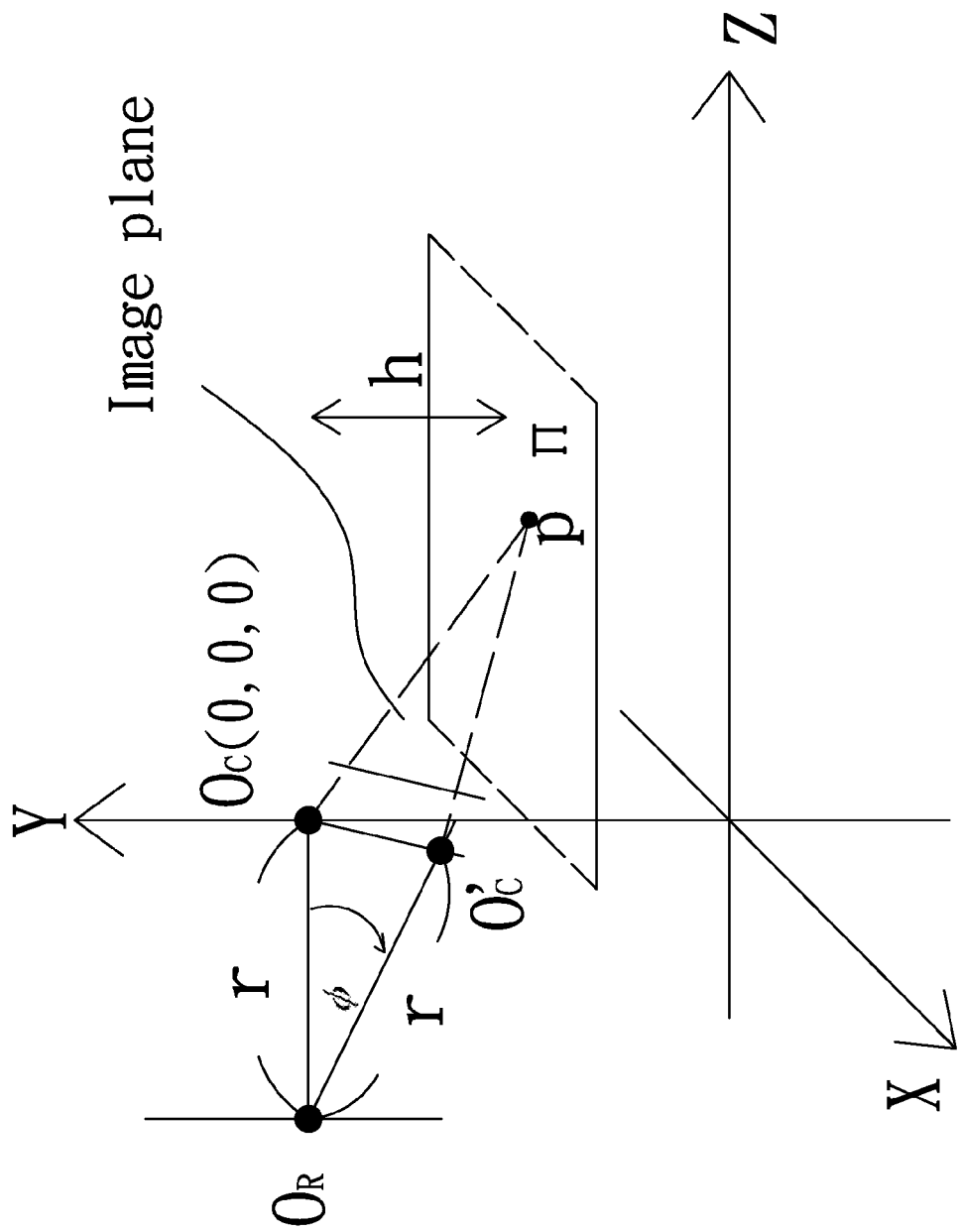
FIG. 3 is a diagram schematically illustrating a basic modeling of a video capture device setup of the present invention.

Please refer to FIG. 3. FIG. 3 is a diagram schematically illustrating a basic modeling of a video capture device according to the present invention. This model has been used in the video capture device of the present embodiment and the video capture devices in the following embodiments. Here, assume that the video capture device 10 is held above a horizontal plane Π with a height h. The rotation center of the video capture device 10 is denoted as $O_R$ and the projection center of the video capture device 10 denoted as $O_C$, which is away from $O_R$ with a distance r. For the video capture device 10, its "rectified" pose is defined to be the case when the optical axis of the video capture device is parallel to the horizon. It is said that when the video capture device 10 is rectified, its tilt angle is zero degrees. With respect to this rectified pose, a "rectified world coordinate system" is defined, where the projection center $O_c$ is defined as the origin, the Z-axis is along the optical axis, and the X- and Y-axis are parallel to the x- and y-axis of the projected image plane, respectively. When the video capture device 10 has a tilt angle $\phi$ and a pan angle $\theta$ with respect to its rectified pose, the projection center moves to a new position $O_C'$. The back projection function $B(p,\theta,\phi,h,\Omega)$ could be deduced from the image coordinates $p=(x,y)$ on a tilted and panned video capture device 10, under the constraint that the observed 3-D point is lying on a horizontal plane with $Y=-h$. The back projection function $B(p,\theta,\phi,h,\Omega)$ can be expressed as follows:

$$\begin{bmatrix} X \\ Y \\ Z \end{bmatrix} = \begin{bmatrix} \dfrac{\beta x C_\theta(rS_\phi - h) + \alpha y S_\theta(r - hS_\phi) - \alpha\beta h C_\phi S_\theta}{\alpha(yC_\phi - \beta S_\phi)} \\ -h \\ \dfrac{\beta x S_\theta(h - rS_\phi) + \alpha y C_\theta(r - hS_\phi) - \alpha\beta h C_\phi C_\theta}{\alpha(yC_\phi - \beta S_\phi)} \end{bmatrix} \quad (1)$$

$$\equiv B(p, \theta, \phi, h, \Omega)$$

Here, $C_\theta$, $S_\theta$, $C_\phi$, and $S_\phi$ represent $\cos(\theta)$, $\sin(\theta)$, $\cos(\phi)$, and $\sin(\phi)$ respectively. $\Omega$ represents the set of intrinsic parameters of the video capture device.

Figure 4:
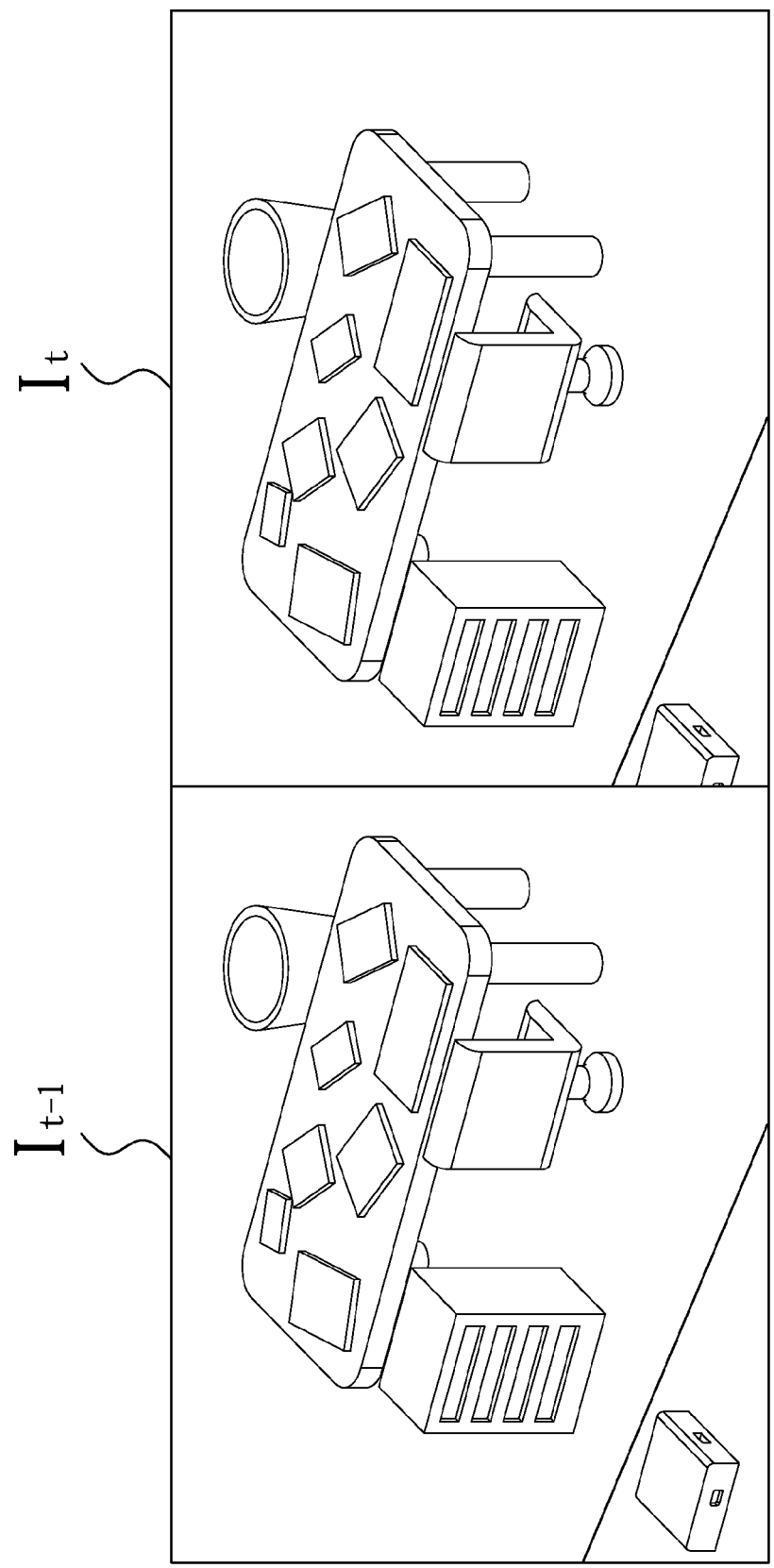
FIG. 4 is a diagram schematically illustrating two successive images $I_{t-1}$ and $I_t$ captured by the video capture device of the present invention.
Figure 5:
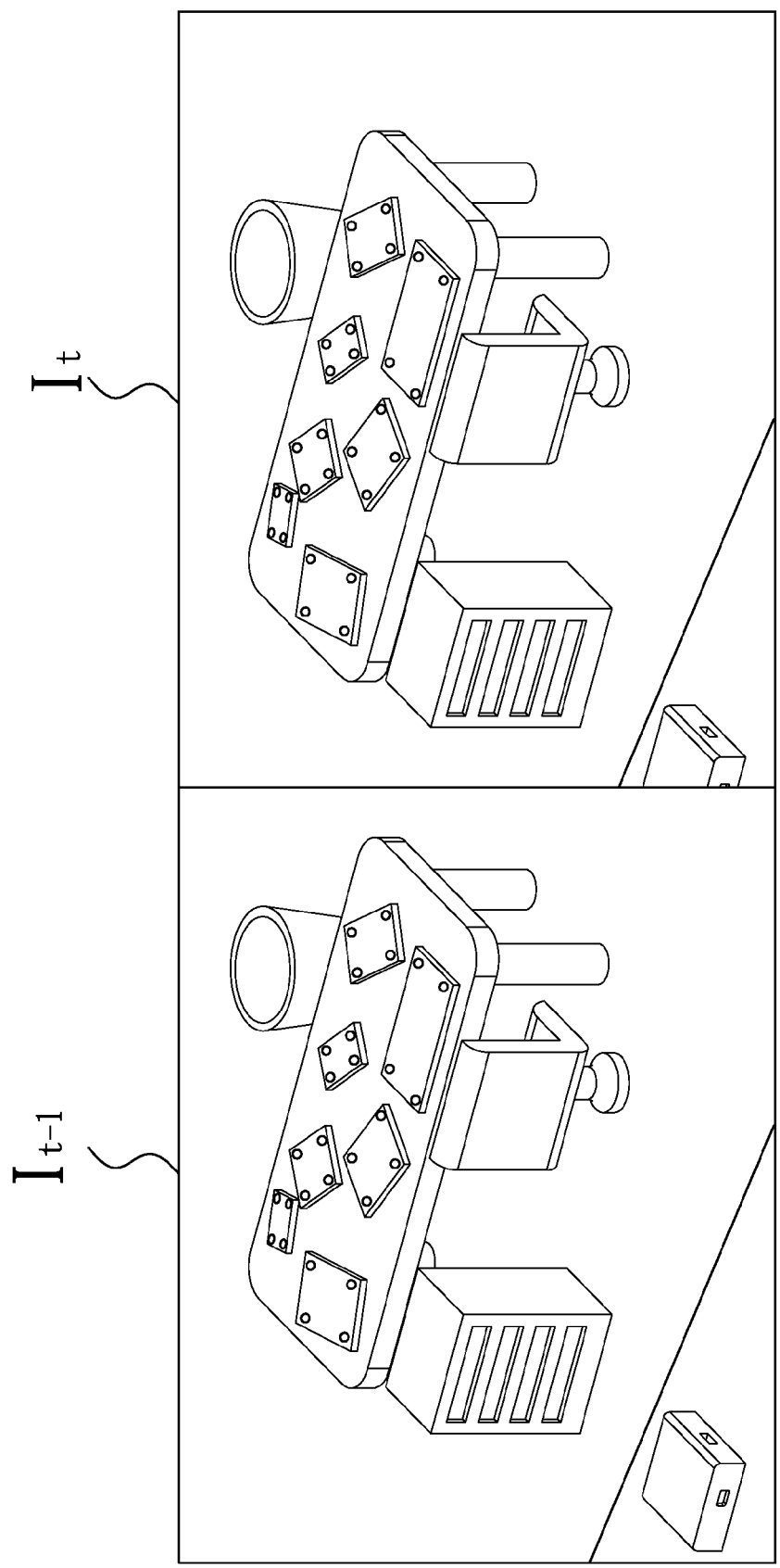
FIG. 5 is a diagram schematically illustrating the feature point extraction from the initial image $I_{t-1}$ and the image $I_t$ of the present invention.

At first, at time instant t-1, the video capture device 10 has a tilt angle $\phi_{t-1}$ and a pan angle $\theta_{t-1}$, with a height h. The video capture device 10 captures an initial image $I_{t-1}$, as shown in FIG. 4. Then the video capture device 10 starts to pan or tilt at time instant t, and captures a successive image $I_t$ with different pan and tilt angles, as shown in FIG. 4. Please refer to FIG. 5 as well as FIG. 4. the computer system 12 extracts a plurality of initial feature points from the books on the table in the initial image $I_{t-1}$, and then extracts a plurality of feature points corresponding to the initial feature points from the books of the successive image $I_t$. Here, the computer system 12 could use the KLT method to extract and track these feature points in the successive image, and all extracted feature points are corresponding to some unknown static points in the 3-D space.

Figure 6:
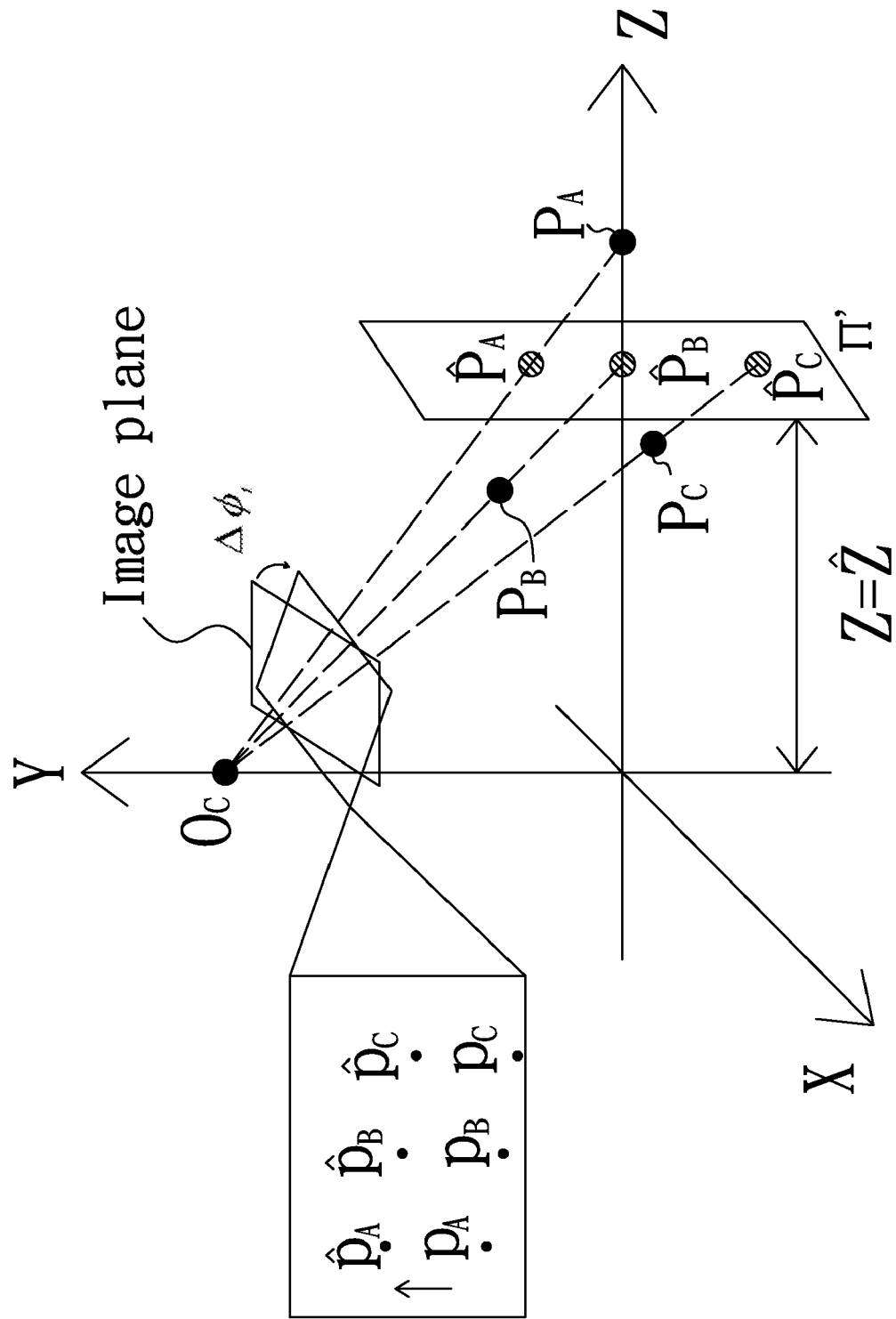
FIG. 6 is a diagram schematically illustrating a pseudo plane according to an embodiment of the present invention.

Assume that the rotation radius r of the video capture device 10 is far smaller than the distances between these 3-D feature points and the video capture device 10. Also assume the variations of pan angle and tilt angle are very small during the capturing of two successive images. With these two assumptions, the projection center $O_C$ can be thought to be fixed with respect to the 3-D feature points while the video capture device 10 is panning or tilting, as illustrated in FIG. 6. Moreover, assume there are three 3-D spatial points $P_A$, $P_B$ and $P_C$ in the scene. Three projection lines are formed respectively by connecting the projection center $O_C$ and $P_A$, $P_B$ and $P_C$. These three lines intersect the image plane of the video capture device 10 on the initial feature points $p_A$, $p_B$ and $p_C$, respectively. Along with the three projection lines, the initial feature points $p_A$, $p_B$ and $p_C$ could be back projected onto a pseudo plane Π', which forms three pseudo points $\hat{P}_A$, $\hat{P}_B$, and $\hat{P}_C$. Wherein the coordinates of the pseudo plane Π' is $(0,0,\hat{Z})$. In other words, the three 3-D points $P_A$, $P_B$ and $P_C$ can be replaced by the three pseudo points $\hat{P}_A$, $\hat{P}_B$, and $\hat{P}_C$ on their projection lines. There is no influence on the projected points in the image plane as long as the projection center of the device 10 is thought to be fixed. Additionally, if these 3-D points $P_A$, $P_B$ and $P_C$ stay static during the capture of images, the corresponding feature points in image $I_t$ can also be back-projected onto the same pseudo points $\hat{P}_A$, $\hat{P}_B$, and $\hat{P}_C$ on the pseudo plane Π'. That is, if the video capture device 10 has the pan angle $\theta_{t-1}$ and the tilt angle $\phi_{t-1}$ while capturing the initial image $I_{t-1}$, and has the pan angle $\theta_{t-1}+\Delta\theta_t$ and the tilt angle $\phi_{t-1}+\Delta\phi$ while capturing the image $I_t$, the computer system 12 can find the optimal $\Delta\theta_t$ and $\Delta\phi_t$ that minimize the following formula:

$$D = \sum_{k=1}^{K} \left\| \hat{B}(\hat{p}_k, \theta_{t-1} + \Delta\theta_t, \phi_{t-1} + \Delta\phi_t) - \hat{B}(p_k, \theta_{t-1}, \phi_{t-1}) \right\|^2 \quad (2)$$

In the equation (2), $\hat{B}$ represents the back projection function of an image feature point onto the pseudo plane Π'. $p_k$ denotes an initial feature point in the initial image $I_{t-1}$, and $\hat{p}_k$ denotes the feature point in the successive image $I_t$ corresponding to the initial feature point. K is the total number of image feature points for calibration. Please note that, the altitude parameter h can be ignored if the Z coordinate is fixed. The intrinsic parameter $\Omega$ can also be ignored since it is not changed when the video capture device 10 pans and tilts. Therefore, based on the equation (2), the computer system 12 can determine the variation of pan angle $\Delta\theta_t$ and the variation of tilt angle $\Delta\phi_t$ according to the displacement between the initial feature points and the feature points, and then derive the pan angle $\theta_{t-1}+\Delta\theta_t$ and the tilt angle $\phi_{t-1}+\Delta\phi$ while capturing the image $I_t$.

Figure 7:
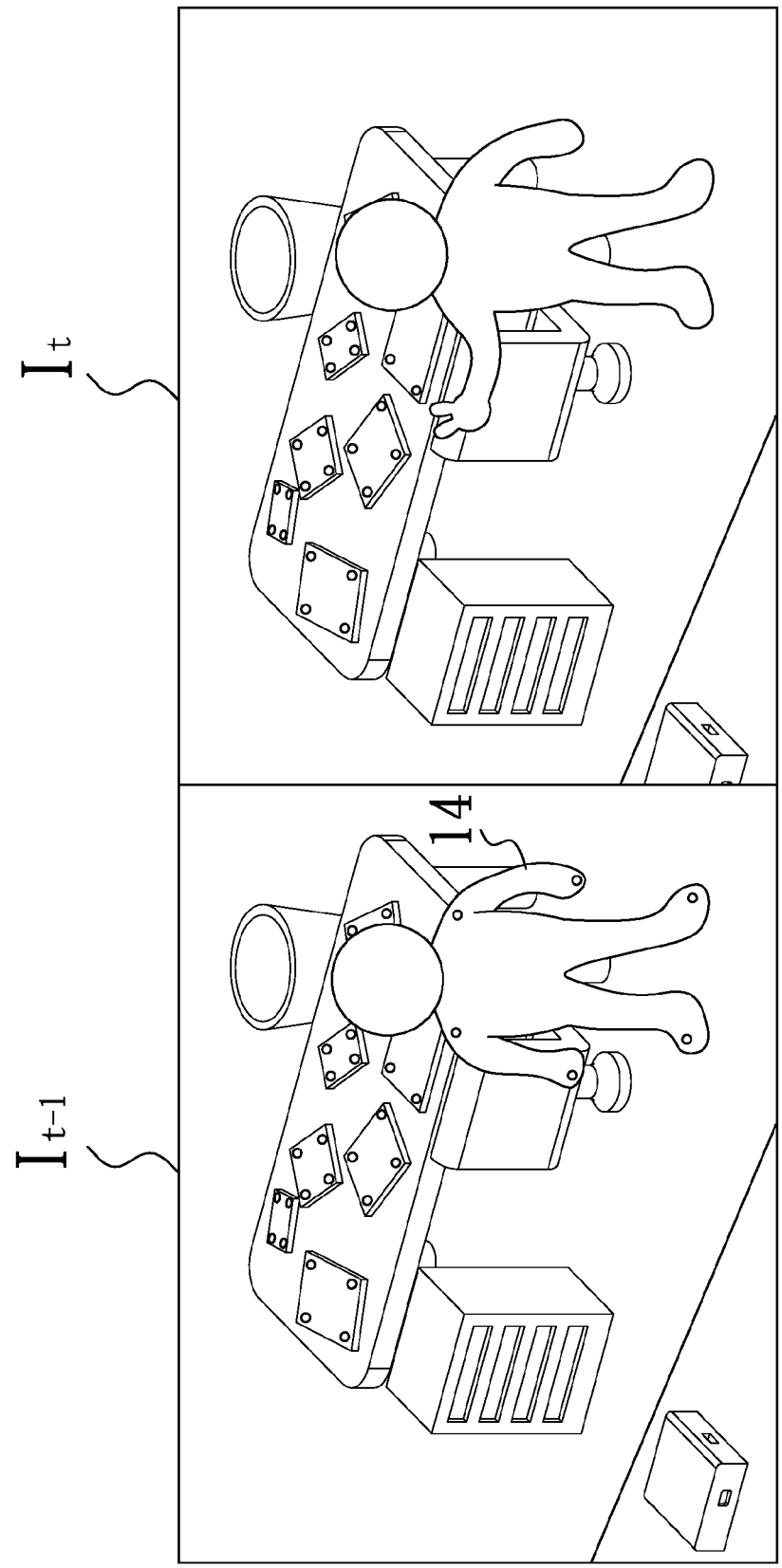
FIG. 7 is a diagram schematically illustrating a moving object appears in the image according to an embodiment of the present invention.

Moreover, the aforementioned method has assumed that all the feature points utilized for calibration correspond to some static 3-D points in the scene. However, in real applications, such as object tracking or positioning, some moving objects may be present. To guarantee accurate calibration, the feature points related to moving objects should be removed. As shown in FIG. 7, a moving object (e.g. a human being 14) exists in the initial image $I_{t-1}$. Thus, the initial feature points corresponding to the human being 14 should be removed and discarded in order to assure the accuracy of calibration. The same, any feature points related to the moving object appearing in the image $I_t$ should be removed as well.

The dynamic calibration operation of determining whether the initial feature points and the feature points come from moving objects is detailed as follows. Because the initial image and the successive image are captured with different angles, displacements exist between the initial feature points and the corresponding feature points. Therefore, in the present invention, the computer system 12 first makes the video capture device rotate under different angles in the static scene (i.e. the scene without any moving object) to calculate the displacements between all initial feature points and the corresponding feature points, and then derives the median from these displacements for each different rotation angle. Next, the computer system 12 calculates the standard deviation of the displacements based on each median, and plots the relationship between the standard deviations and the corresponding medians. In practice, the feature point displacements in the static scene have a similar statistical behavior. However, the statistical behavior for the feature point displacements which come from moving objects will be much different. Thus, when the displacement of a feature point is away from the median by three standard deviations, that feature point is treated as an undesired feature point and discarded.

Figure 8:
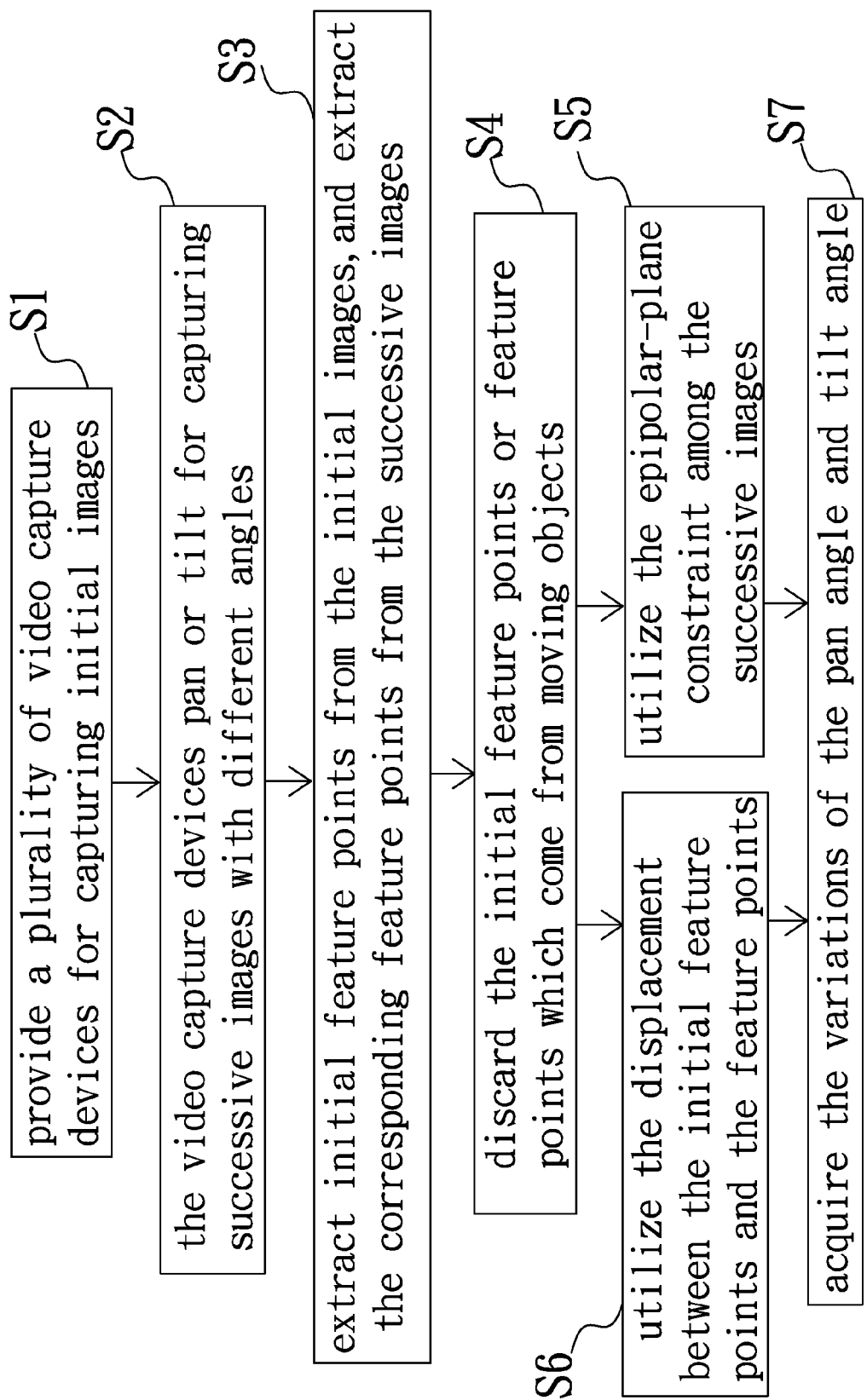
FIG. 8 shows a flowchart describing a dynamic calibration method for a plurality of video capture devices according another exemplary embodiment of the present invention.

Please refer to FIG. 8. FIG. 8 shows a flowchart describing a dynamic calibration method for a plurality of video capture devices according another exemplary embodiment of the present invention. Provided that substantially the same result is achieved, the steps of the flowchart shown in FIG. 8 need not be in the exact order shown and need not be contiguous, that is, other steps can be intermediate. As shown in step S1, a plurality of video capture devices are provided to capture the initial images, wherein the initial pose and related 3-D position of each video capture device are defined. Then proceed to step S2. The video capture devices start to pan or tilt to capture the successive images with different angles. In step S3, for the multiple video capture devices, the computer system 12 extracts a plurality of initial feature points from the initial images based on the KLT algorithm, and extracts the feature points corresponding to the initial feature points from the successive images. As shown in step S4, if the initial feature points in the initial images and the feature points in the successive images come from moving objects, these feature points should be discarded in order to increase the accuracy of calibration. Then proceed to step S5 and step S6. Every two video capture devices can form some epipolar planes based on their initial related positions. That is, for two video capture devices, their projection centers, together with one initial feature point in the initial image of any one capture device, determine an epipolar plane. The epipolar plane will be fixed as long as these two projection centers can be thought to be fixed, and the observed point remains static in the space. Hence, the feature point in the successive image will still lie on the corresponding epipolar plane. Then, for each video capture device, the computer system 12 can acquire the variations of pan angle and tilt angle according to the epipolar-plane constraint and the displacements between the initial feature points in the initial image and the feature points in the successive image, as shown in step S7.

The dynamic calibration operation of a plurality of video capture devices for determining whether the initial feature points and the feature points come from moving objects is detailed as follows. Because the initial image and the successive image are captured with different angles, displacements exist between the initial feature points and the corresponding feature points. Therefore, in the present invention, the computer system 12 first makes each video capture device rotate under different angles in the static scene (i.e. the scene without any moving object) to calculate the displacements between all initial feature points and the corresponding feature points, and then derives the median from these displacements for each different rotation angle. Next, the computer system 12 calculates the standard deviation of these displacements based on each median, and plots the relationship between the standard deviations and the corresponding medians. In practice, for each video capture device, the feature point displacements in the static scene have a similar statistical behavior. However, the statistical behavior for the feature point displacements which come from moving objects will be much different. Thus, when the displacement of a feature point is away from the median by three standard deviations, that feature point is treated as an undesired feature point and discarded.

Moreover, the extracted feature points on the same epipolar plane in the images captured from different video capture devices are not limited to exactly come from the same 3-D points. That is, the feature points on the corresponding epipolar lines in the images of a video capture device pair may not be point-wise matched. However, their back-projected points in the 3-D space must be "somewhere" on the corresponding epipolar planes.

The further dynamic calibration method for a plurality of video capture devices is detailed as follows.

Figure 9:
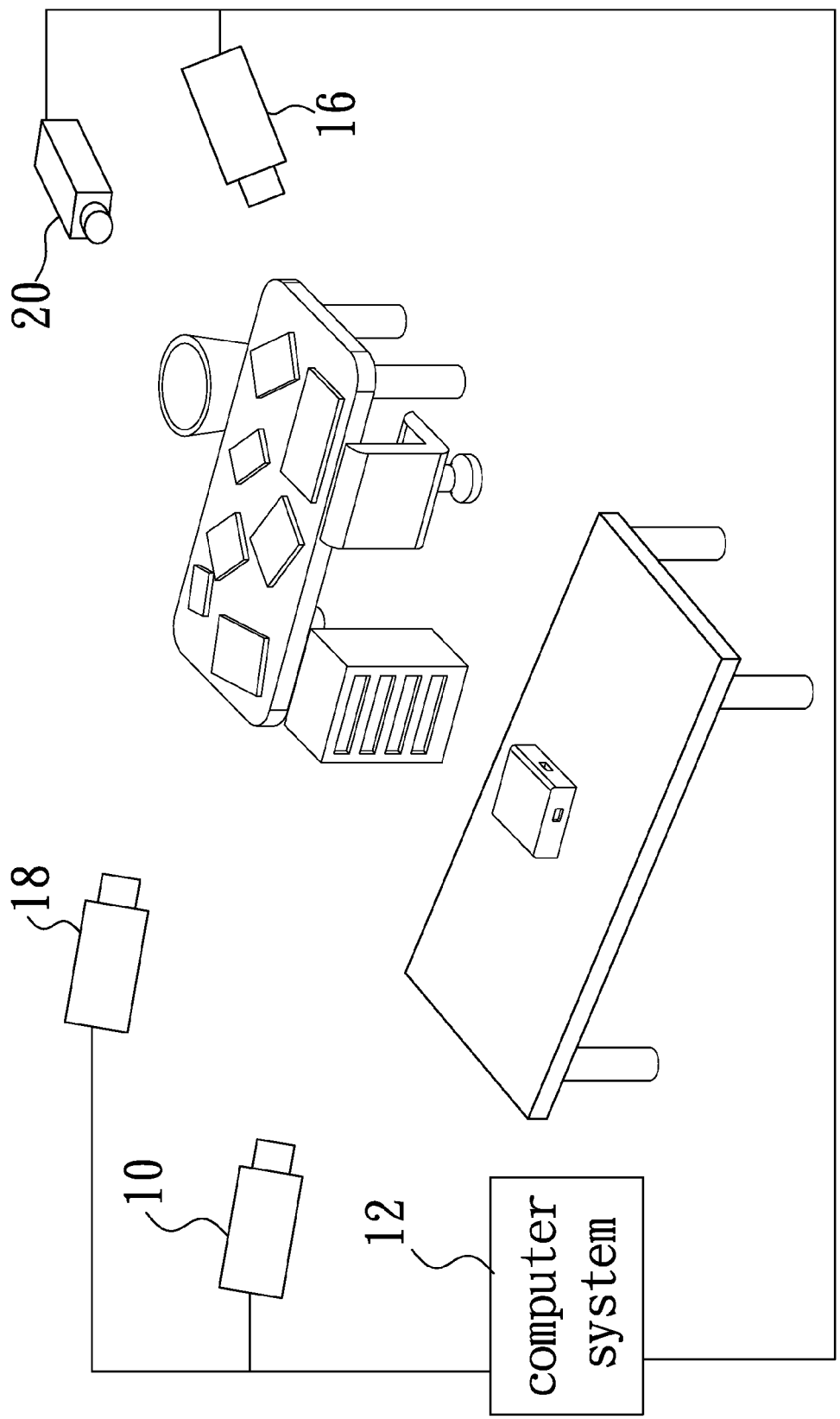
FIG. 9 is a diagram schematically illustrating a calibration system of a plurality of video capture devices according to another embodiment of the present invention.

Please refer to FIG. 9. FIG. 9 is a diagram schematically illustrating a calibration system for a plurality of video capture devices according to another embodiment of the present invention. As shown in FIG. 9, the calibration system for the video capture device in the present invention includes a plurality of video capture devices 10, 16, 18, and 20 in an environment. Please note that, the video capture devices 10, 16, 18, and 20 can be pan-tilt-zoom (PTZ) cameras, or other video devices. To further increase the accuracy of calibration, the 3-D spatial relationship among video capture devices should be taken into concern in addition to the aforementioned displacement information between feature points in the temporal domain. Here, the dynamic calibration in the present invention is achieved by adding the epipolar-plane constraint among a plurality of video capture devices.

Figure 10:
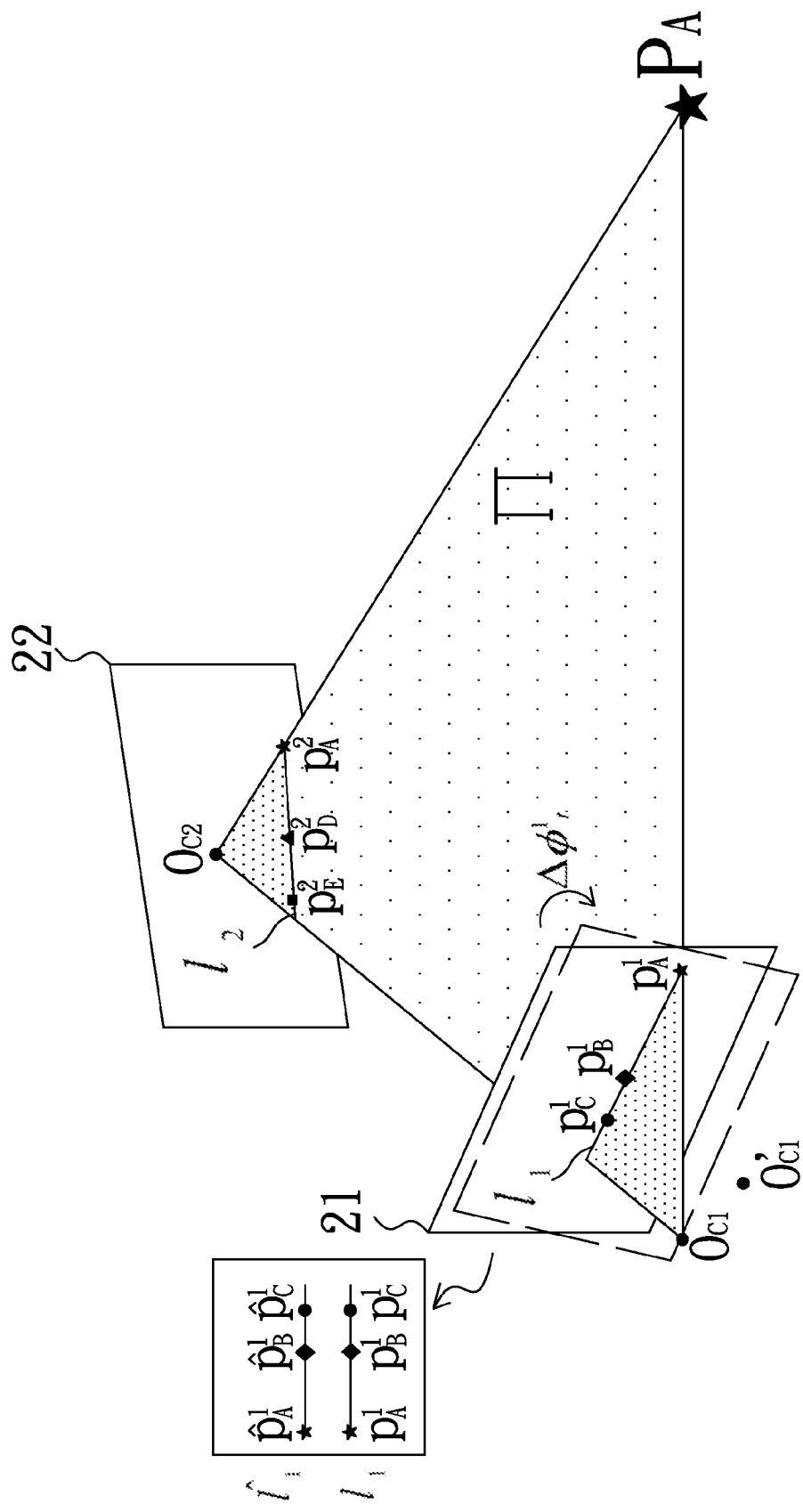
FIG. 10 is a diagram schematically illustrating an epipolar plane formed by a pair of video capture devices.

In specific, the epipolar-plane constraint is composed of a pair of video capture devices and a feature point on the image of one video capture device. Here, take the video capture devices 10 and 16 for instance. As shown in FIG. 10, assume that the projection centers of the video capture devices 10 and 16 are $O_{C1}$ and $O_{C2}$, respectively. There is one point, namely $P_A$, in the 3-D space. The projection centers $O_{C1}$ and $O_{C2}$, together with the 3-D point $P_A$, determine an epipolar plane Π. This epipolar plane Π intersects the image plane 21 of the video capture device 10 to form the initial epipolar line $l_1$, and intersects the image plane 22 of the video capture device 16 to form the initial epipolar line $l_2$. If $p_A^1$ and $p_A^2$ are the projected points of the 3-D point $P_A$ on the image planes 21 and 22, they must lie on $l_1$ and $l_2$, respectively. Hence, $p_A^1$, $p_A^2$, $O_{C1}$, and $O_{C2}$ are coplanar. Moreover, other points in the 3-D space are also projected onto the initial epipolar lines $l_1$ and $l_2$. For example, $p_B^1$ and $p_C^1$ are located on the initial epipolar line $l_1$, and $p_D^1$ and $p_E^1$ are located on the initial epipolar line $l_2$. The epipolar plane Π can be expressed as follows:

$$\pi(O_{C1}, O_{C2}, p_A^1, \theta^1, \phi^1) = \overline{O_{C2}O_{C1}} \times \overline{O_{C1}B(p_A^1, \theta^1, \phi^1)} \quad (3)$$

$$\text{or } \pi(O_{C1}, O_{C2}, p_A^2, \theta^2, \phi^2) = \overline{O_{C1}O_{C2}} \times \overline{O_{C2}B(p_A^2, \theta^2, \phi^2)}. \quad (4)$$

Wherein $B(p_A^1, \theta^1, \phi^1)$ and $B(p_A^2, \theta^2, \phi^2)$ are the functions defined in the equation (1).

In the exemplary embodiment of the present invention, at first, the video capture devices 10 and 16 have been calibrated at the time instant t-1. The pan and tilt angles of the video capture device 10 are $\theta^1_{t-1}$ and $\phi^1_{t-1}$, while the pan and tilt angles of the video capture device 16 are $\theta^2_{t-1}$ and $\phi^2_{t-1}$. The video capture device 10 captures the initial image $I^1_{t-1}$, while the video capture device 16 captures the initial image $I^2_{t-1}$. At the time instant t, the video capture device 10 rotates to a new pan angle $\theta^1_{t-1}+\Delta\theta^1_t$ and a new tilt angle $\phi^1_{t-1}+\Delta\phi^1_t$, while the video capture device 16 rotates to a new pan angle $\theta^2_{t-1}+\Delta\theta^2_t$ and a new tilt angle $\phi^2_{t-1}+\Delta\phi^2_t$. The video capture device 10 captures the successive image $I^1_t$, while the video capture device 16 captures the successive image $I^2_t$. Next, the computer system 12 extracts an initial feature point $p_A^1$ from the initial image $I^1_{t-1}$, and extracts a corresponding feature point $\hat{p}_A^1$ from the image $I^1_t$. That is, at the time instant t, the initial feature point $p_A^1$ moves to the feature point $\hat{p}_A^1$ in the image $I^1_t$. Similarly, the video capture device 16 extracts an initial feature point $p_A^2$ from the initial image $I^2_{t-1}$, and extracts a corresponding feature point $\hat{p}_A^2$ from the image $I^2_t$. That is, at the time instant t, the initial feature point $p_A^2$ moves to the feature point $\hat{p}_A^2$ in the image $I^2_t$.

Next, to address the issue in more detail, please refer to the calibration method for the video capture device 10 first. As mentioned above, at the time instant t-1, the initial feature points $p_A^1$ and $p_A^2$, and the projection centers $O_{C1}$ and $O_{C2}$ are located on the same epipolar plane Π, as shown in FIG. 10. At the time instant t, since the 3-D point $P_A$ is static, the pan angle $\theta^1_{t-1}+\Delta\theta^1_t$ and the tilt angle $\phi^1_{t-1}+\Delta\phi^1_t$ of the video capture device 10 can be found such that the feature point $\hat{p}_A^1$ in the image $I^1_t$ is still located on the same epipolar plane. That is, $\Delta\theta^1_t$ and $\Delta\phi^1_t$ can be found such that:

$$B(\hat{p}_A^1, \theta^1_{t-1}+\Delta\theta^1_t, \phi^1_{t-1}+\Delta\phi^1_t) \cdot \pi(O_{C1}, O_{C2}, p_A^1, \theta^1_{t-1}, \phi^1_{t-1}) = 0 \quad (5)$$

Similarly, for $p_B^1$ and $p_C^1$ which share the same epipolar line with $p_A^1$, $\Delta\theta^1_t$ and $\Delta\phi^1_t$ can be found as follows:

$$B(\hat{p}_B^1, \theta^1_{t-1}+\Delta\theta^1_t, \phi^1_{t-1}+\Delta\phi^1_t) \cdot \pi(O_{C1}, O_{C2}, p_A^1, \theta^1_{t-1}, \phi^1_{t-1}) = 0 \quad (6)$$

$$B(\hat{p}_C^1, \theta^1_{t-1}+\Delta\theta^1_t, \phi^1_{t-1}+\Delta\phi^1_t) \cdot \pi(O_{C1}, O_{C2}, p_A^1, \theta^1_{t-1}, \phi^1_{t-1}) = 0 \quad (7)$$

In order to increase the accuracy of calibration, the dynamic calibration method in the present invention can extract a plurality of epipolar lines. Assume that m epipolar lines have been extracted from the initial image $I^1_{t-1}$. On the jth epipolar line, where j=1, 2, ..., m, $n_j$ feature points $\{p_{j,1}^1, p_{j,2}^1, \ldots, p_{j,n_j}^1\}$ have been extracted on image $I^1_{t-1}$. These $n_j$ feature points move to feature points $\{\hat{p}_{j,1}^1, \hat{p}_{j,2}^1, \ldots, \hat{p}_{j,n_j}^1\}$ on image $I^1_t$. Based on the epipolar-plane constraint, the optimal $\Delta\theta^1_t$ and $\Delta\phi^1_t$ can be estimated by minimizing the following equation:

$$G_t^1 = \quad (8)$$
$$\sum_{j=1}^{m}\sum_{i=1}^{n_j} \|B(\hat{p}_{j,i}^1, \theta^1_{t-1}+\Delta\theta^1_t, \phi^1_{t-1}+\Delta\phi^1_t) \cdot \pi(O_{C1}, O_{C2}, p_j^1, \theta^1_{t-1}, \phi^1_{t-1})\|^2$$

Furthermore, under the construction of a plurality of video capture devices, the variations of the pan angle and tilt angle of the video capture device 10 can be taken into account with the displacement of all feature points and the epipolar-plane constraint. That is, by integrating the equations (2) and (8), $\Delta\theta^1_t$ and $\Delta\phi^1_t$ can be estimated by minimizing the following equation:

$$F_t^1 = \sum_{j=1}^{m}\sum_{i=1}^{nj} \left\| \hat{B}(\hat{p}_{j,i}^1, \theta_{t-1}^1 + \Delta\theta_t^1, \phi_{t-1}^1 + \Delta\phi_{t-1}^1) - \hat{B}(p_{j,i}^1, \theta_{t-1}^1, \phi_{t-1}^1) \right\|^2 + \quad (9)$$

$$\lambda \sum_{j=1}^{m}\sum_{i=1}^{nj}$$

$$\left\| B(\hat{p}_{j,i}^1, \theta_{t-1}^1 + \Delta\theta_t^1, \phi_{t-1}^1 + \Delta\phi_t^1) \cdot \pi(O_{C1}, O_{C2}, p_j^1, \theta_{t-1}^1, \phi_{t-1}^1) \right\|^2$$

Since the video capture device 16 has the same calibration method and operation with the video capture device 10, detailed description is omitted for the sake of brevity. Similarly, the variations of pan angle $\Delta\theta_t^2$ and tilt angle $\Delta\phi_t^2$ of the video capture device 16 can be estimated by minimizing the following equation:

$$F_t^2 = \quad (10)$$

$$\sum_{j=1}^{m}\sum_{i=1}^{nj} \left\| \hat{B}(\hat{p}_{j,i}^2, \theta_{t-1}^2 + \Delta\theta_t^2, \phi_{t-1}^2 + \Delta\phi_{t-1}^2) - \hat{B}(p_{j,i}^2, \theta_{t-1}^2, \phi_{t-1}^2) \right\|^2 + \lambda$$

$$\sum_{j=1}^{m}\sum_{i=1}^{nj} \left\| B(\hat{p}_{j,i}^2, \theta_{t-1}^2 + \Delta\theta_t^2, \phi_{t-1}^2 + \Delta\phi_t^2) \cdot \pi(O_{C1}, O_{C2}, p_j^2, \theta_{t-1}^2, \phi_{t-1}^2) \right\|^2$$

Here, $\lambda$ is a parameter to weight the contributions of the displacement of feature points and the epipolar plane constraint.

Figure 11:
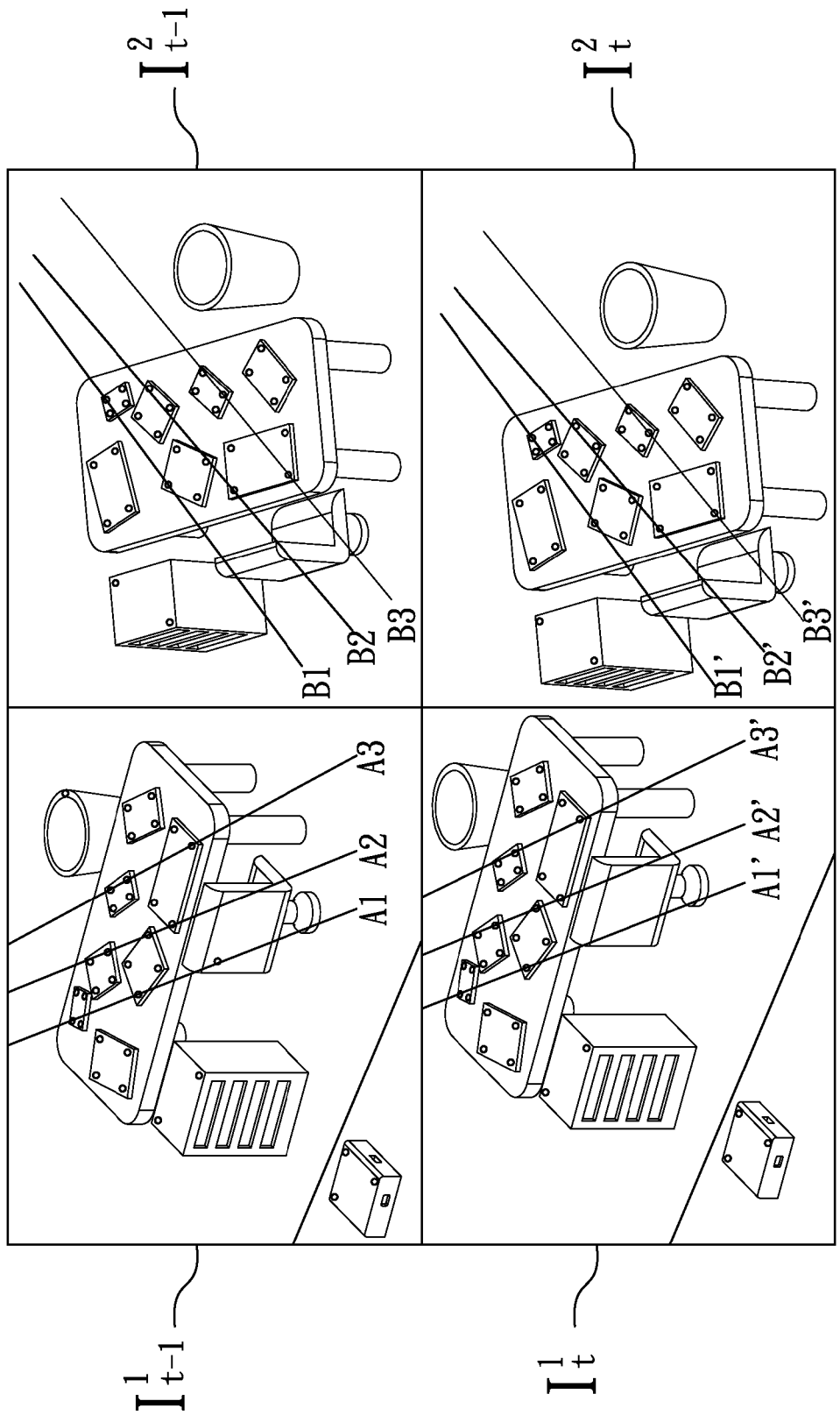
FIG. 11 is a diagram schematically illustrating the images captured by a video capture device pair at different timing, and the three corresponding epipolar lines.

As shown in FIG. 11, the video capture devices 10 and 16 capture the initial image $I^1_{t-1}$ and $I^2_{t-1}$ respectively at the time instant t-1. There are three initial epipolar lines A1, A2, and A3 in the image $I^1_{t-1}$. There are three initial epipolar lines B1, B2, and B3 corresponding to the initial epipolar lines A1, A2, and A3 in the image $I^2_{t-1}$. These initial epipolar lines A1, A2, A3, B1, B2, and B3 form three epipolar planes. Next, the video capture devices 10 and 16 capture the image $I^1_t$ and $I^2_t$ respectively at the time instant t. There are three epipolar lines A1', A2', and A3', corresponding to the initial epipolar lines A1, A2, and A3, in the image $I^1_t$. There are three epipolar lines B1', B2', and B3', corresponding to the initial epipolar lines B1, B2, and B3, in the image $I^2_t$. Therefore, the computer system 12 can calculate the variations of the pan angle and tilt angle of the video capture devices 10 and 16 according to the epipolar-plane constraint at the time instant t-1 and the displacement between the feature points. That is, at the time instant t, the new pan angle $\theta^1_{t-1}+\Delta\theta^1_t$ and tilt angle $\phi^1_{t-1}+\Delta\phi^1_t$ of the video capture device 10, and the new pan angle $\theta^2_{t-1}+\Delta\theta^2_t$ and tilt angle $\phi^2_{t-1}+\Delta\phi^2_t$ of the video capture device 16 can be derived based on the equations (9) and (10).

Furthermore, the extracted feature points on the same epipolar plane in the images captured from different video capture devices are not limited to exactly come from the same 3-D points. Moreover, the dynamic calibration method in the present invention utilizes the epipolar-plane constraint rather than the complicated point-wise correspondence of feature points in the related art. Therefore, the calibration method in the present invention allows different numbers of feature points located on the corresponding epipolar lines in the image pair captured by the devices 10 and 16. As shown in FIG. 11, there are three feature points on the initial corresponding epipolar lines, A1 in the image $I^1_{t-1}$ and B1 in the image $I^2_{t-1}$; however, there are only two feature points on the epipolar line A1' in the image $I^1_t$. Nevertheless, the epipolar lines A1' and B1', together with the initial epipolar lines A1 and B1, are still located on the same epipolar plane.

Actually, in practice, as long as an initial feature point in the initial image is within the predefined distance from an initial epipolar line, that initial feature point is treated as on the initial epipolar line. Similarly, as long as a feature point in the successive image is within the predefined distance from the epipolar line, that feature point is treated as on the epipolar line. In this embodiment, the predefined distance is three pixels. However, the predefined distance is not limited to the above definition. That is, in other embodiments, the predefined distance can be assigned by different conditions depending on design requirements.

In contrast to the related dynamic calibration operation art, the calibration method of the present invention utilizes the epipolar-plane constraint and the displacement of feature points to calibrate the pan angle and tilt angle of each video capture device. That is, the dynamic calibration method of the present invention provides an easier and more efficient process to acquire the variations of the pan angle and tilt angle of the video capture device without any specific calibration pattern, indicator, or a complicated correspondence of feature points. The dynamic calibration method of the present invention can be applied to a wide-range surveillance system with a plurality of video capture devices. Moreover, the calibration method of the present invention also allows the presence of moving objects in the captured scenes while performing calibration. Hence, the dynamic calibration method of the present invention can be very useful for applications related to active video surveillance.

Those described above are only the preferred embodiments to exemplify the present invention but not to limit the scope of the present invention. Any equivalent modification or variation according to the shapes, structures, features and spirit disclosed in the specification is to be also included within the scope of the present invention.

What is claimed is:

1. A dynamic calibration method for video capture devices, comprising:

providing a plurality of video capture devices each capable of independent panning and tilting;

operatively coupling said plurality of video capture devices to a computer system;

capturing at least one initial image by each of said plurality of video capture devices;

controlling, through said computer system, panning or tilting of said each video capture device for capturing at least one successive image with different angles, and comparing, by said computer system, said at least one initial and at least one successive images captured by different of said plurality of video capture devices to obtain calibration pan and tilt angles through the steps of:

processing, at said computer system, said at least one initial image captured by said each video capture device by extracting at least one initial feature point from said at least one initial image of said each video capture device, and forming an epipolar plane according to projection centers and said at least one extracted initial feature points on said at least one initial images taken by said each video capture device in each pair of video capture devices from said plurality thereof;

extracting at least one second feature point from said at least one successive image, wherein said at least one second feature point corresponds to said at least one initial feature point and is located on said epipolar plane of corresponding said each pain of video capture devices, wherein said at least one initial and said at least one second feature points extracted from said at least one initial and successive images captured by a first video capture device from said each pair thereof correspond to at least a first 3-D point, and wherein said at least one initial and said at least one second feature points extracted from said at least one initial and successive images captured by a second video capture device from said each pair thereof correspond to at least a second 3-D point; and acquiring, by said computer system, variations of a pan angle and a tilt angle of said each video capture device according to an epipolar-plane constraint corresponding to said each pair of video capture devices, wherein said at least first 3-D point deviates from said at least second 3-D point.

2. The calibration method of claim 1, further comprising the steps of:

acquiring, by said computer system, said variations of said pan angle and said tilt angle of said each video capture device according to displacements between said at least one initial feature point and said at least one second feature point.

3. The calibration method of claim 1, further comprising the steps of:

determining, by said computer system, whether said at least one initial feature point is produced by a moving object by changing a position of said each video capture device through a plurality of pan and tilt angles, calculating corresponding displacements between a plurality of initial features points for said plurality of the pan and tilt angles, deriving a median for said displacement for said plurality of pan and tilt angles, calculating standard deviation of said displacements based on each said median, marking said at least one initial feature point as produced from a moving object if said displacements express statistical behavior different than other initial feature points of said plurality thereof, and when said at least one initial feature point comes from a moving object, discarding said at least one initial feature point.

4. The calibration method of claim 1, further comprising the steps of:

determining, by said computer system, whether said at least one second feature point is produced by a moving object by changing a position of said each video capture device through a plurality of pan and tilt angles, calculating corresponding displacements between a plurality of second feature points for said plurality of the pan and tilt angles, deriving a median for said displacements for said plurality of pan and tilt angles, calculating standard deviation of said displacements based on each said median, marking said at least one second feature point as produced from a moving object if said displacements express statistical behavior different than other second feature points of said plurality thereof, and when said at least one second feature point comes from a moving object, discarding said at least one second feature point.

5. The calibration method of claim 1, wherein said video capture devices are video cameras.

6. The calibration method of claim 1, wherein said at least one initial feature point is located on an initial epipolar line, and when said at least one initial feature point is within a predefined distance from said initial epipolar line, said at least one initial feature point is treated as being located on said initial epipolar line.

7. The calibration method of claim 1, wherein said at least one second feature point is located on an epipolar line, and when said at least one second feature point is within a predefined distance from said epipolar line, said at least one second feature point is treated as being located on said epipolar line.

* * * * *